ns
3,332,927
PROCESS FOR POLYMERIZATION
Robert W. Cottingham, Newburyport, Mass., assignor to Cabot Corporation, Boston, Mass., a corporation of Delaware
No Drawing. Continuation of applications Ser. No. 277,492, May 2, 1963, Ser. No. 255,162, Jan. 31, 1963, and Ser. No. 270,818, Apr. 5, 1963. This application Feb. 14 1966, Ser. No. 527,036
9 Claims. (Cl. 260—93.7)

The present application is a continuation of copending U.S. applications Serial Nos. 255,162, 270,818, and 277,492, filed Jan. 31, 1963, Apr. 5, 1963, and May 2, 1963, respectively, and now all abandoned.

The present invention relates to the polymerization of propylene and in particular to an improved process for the polymerization of propylene and to improved polypropylene compositions.

The art of propylene polymerization is well known. For instance, British Patent No. 803,124 to P. A. Small et al. discloses catalysts suitable for the polymerization of propylene comprising the product of reaction between titanium trichloride and a trialkyl silane. In U.S. Patent No. 3,073,811, to G. Natta et al. it is taught that propylene can be polymerized by means of a catalyst comprising titanium tetrachloride and an aluminum trialkyl. Propylene polymers produced in accordance with said disclosures, as well as those produced by the use of certain other well-known catalysts have many desirable properties, such as relatively great tensile strength, surface gloss, moisture resistance, heat stability, etc., which would seemingly render said polymers admirably suitable for use as textile fibers. However, an inherent deleterious characteristic which has heretofore prevented general acceptance of polypropylene by the textile industry is the resistant nature exhibited by said polymer towards various common dyeing methods and dyestuffs known to the art, In accordance with the present invention, however, this problem has been solved.

Accordingly, it is a principal object of the present invention to provide improved polypropylene compositions.

It is another object of the present invention to provide an improved process for the production fo polypropylene.

It is a further object of the present invention to provide polypropylene compositions with improved qualities of dyeability.

Other objects of the present invention will in part be obvious and will in part appear hereinafter.

In accordance with the present invention it has been found that the dyeability of polypropylene polymers is vastly improved when propylene is polymerized—

(a) with a catalyst comprising titanium trichloride and certain organometallic compounds, and (b) in the presence of an extremely finely-divided solid metal oxide dispersed in a liquid hydrocarbon medium.

It is pointed out that British Patent No. 910,261 discloses a process for the production of fluidizable catalysts comprising a trihalide of titanium or vanadium, an aluminum alkyl compound, and a solid, inert diluent. However, as is well known in the art, solid diluents for fluidized processes must have an average particle diameter greater than about one micron. When particles having an average particle diameter of less than about one micron are utilized in fluidized beds, said particles are readily entrained by the flowing gases and carried from said bed. In contrast thereto, as will be further discussed again hereinafter, the accomplishment of the useful and desired effects of the present invention requires that the average particle diameter of the metal oxide utilized be less than about 100 and preferably less than about 50 millimicrons. Thus, the solid diluents disclosed in said British Patent are completely unsuitable in the practice of the present invention and likewise, the finely-divided metal oxides of the present invention are normally unsatisfactory in the practice of a fluidized bed process.

The polymerization reaction of the present invention can be effected at suitable temperatures within the range of from about −25° C. to about 250° C., and pressures ranging from below atmospheric upwardly to any desired maximum pressure.

Organometallic compounds suitable for the purposes of the present invention are those compounds conforming to the empirical formula:

$$MM'_v X_n R_y$$

wherein M is chosen from the group consisting of the metals of Groups I, II and III of the periodic table; M' is a metal of Group I of the periodic table; $v$ is a num-number from 0 to 1; each X is any halogen; $n$ is a number from 0 to 3; each R is chosen from the group consisting of monovalent hydrocarbon radicals, monovalent alkoxy radicals, monovalent aryloxy radicals and hydrogen; and $y$ is a number from 1 to 4; or

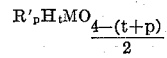

wherein each R' is chosen from the group consisting of monovalent hydrocarbon radicals, monovalent alkoxy radicals, monovalent aryloxy radicals and the halogens; $p$ is a number from 0 to 3; H is a hydride radical; $t$ is a number from 1 to 4; M is a quadrivalent metal chosen from the group consisting of silicon germanium, tin and lead; and O is oxygen.

Specific examples of R and R' groups commonly suitable for substitution in the above formulae include methyl, 2-methyl-2-butyl, n-dodecyl, 4-ethylcyclohexyl, methylnaphthylethyl, tolyl, xylyl, xenyl, methoxy, isobutoxy, n-octyloxy, phenoxy and 1,2-naphthoxy.

Specific compounds conforming to the empirical formula:

$$MM'_v X_n R_y$$

and which are therefore suitable for the purpose of the present invention are organometallic compounds such as butyllithium, di-p-tolylmercury, tri-n-amylboron, triisobutylaluminum, diisobutylaluminum bromide, phenylmercuric iodide, hexylcupric chloride, octylmagnesium hydride, lithium triethyl aluminum bromide and sodium diphenyllithium. Of this group, the aluminum alkyls such as aluminum triisobutyl and aluminum dialkyl chlorides are definitely preferred.

Further specific examples of suitable organometallic compounds conforming to the formula:

$$MM'_v X_n R_y$$

can be found in U.S. Patent 3,166,542, issued Jan. 19, 1965, to Orzechowski et al.

Specific examples of compounds conforming to the formula:

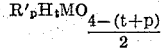

which are suitable for the purposes of the present invention are: trimethylstannane—(CH$_3$)$_3$SnH; triphenylstannane — (C$_6$H$_5$)$_3$SnH; triphenoxysilane — HSi(OC$_6$H$_5$)$_3$; methyldiethylsilane — HSi(C$_2$H$_5$)$_2$CH$_3$; dimethylstannane—(CH$_3$)$_2$SnH$_2$; triethylgermane — (C$_2$H$_5$)$_3$CGeH; triethylsilane — HSi(C$_2$H$_5$)$_3$; ethylsilane — H$_3$SiC$_2$H$_5$; triphenylgermane — (C$_6$H$_5$)$_3$GeH; tri-α-naphthylgermane— (α-C$_{10}$H$_7$)$_3$GeH; tri-n-hexylgermane — (n-C$_6$H$_{13}$)$_3$GeH; di-i-propylgermane—(i-C$_3$H$_7$)$_2$GeH$_2$; plumbane — PbH$_4$; germane—GeH$_4$; stannane—SnH$_4$; 1,2-dihydrotetramethylstannoxane—(CH$_3$)$_2$HSnOSnH(CH$_3$)$_2$; and the like.

Metal oxides suitable for the purposes of the present invention include any metal oxide which is available in finely-divided particulate form. For example, oxides such as silica, magnesia, titania, alumina, zirconia, and mixtures thereof are generally suitable for the purposes of the present invention. It is preferable, of course, that said finely-divided metal oxides be white or colorless. Moreover, it has been found that generally, the smaller the average particle size of said metallic oxide the greater the enhancement of dyeability in the polypropylene composition produced, all other factors being held constant. Conversely, it is well known that the efficiency of catalysts of the above-described type is normally adversely affected by the presence of finely-divided solids. Said adverse affect is usually inversely proportional to the average particle size of the solid. Thus, while some of the beneficial effects of the present invention can be gained by the use of metal oxides having average particle diameters as high as about 100 millimicrons, the optimum combinations of increased dyeability and high catalytic activity are normally achieved when solids having average particle diameters above about 5 millimicrons and below about 50 millimicrons are utilized.

Several classes of hydrocarbons or their mixtures which are liquid and substantially inert under the catalyst forming and polymerization conditions of the present process constitute suitable liquid hydrocarbon media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquified alkanes such as n-hexane, 2,3-dimethylbutane, n-dodecane, dimethylcyclopentane, methyldecalins, and the like are suitable. Also, members of the aromatic hydrocarbon series, such as isopropyl benzene, ethyltoluene, hemimellitene, pseudocumene, isodurene, isoamylbenzene, and particularly the mononuclear aromatic hydrocarbons such as xylenes, mesitylene and xylene-p-cymene mixtures, and the like are completely suitable.

Furthermore, there exists to some extent a direct proportionality between the degree of enhancement of dyeability and the amount of metal oxide present in the polymer composition produced in accordance with the present invention. While concentrations of metal oxides from about 0.25% to about 5% by weight of the total polymer formulation are effective in gaining the beneficial effects of the present invention, it is desirable that said concentrations be maintained below about 4%. Concentrations above about 5% further increase dyeability either to a minor extent or not at all; furthermore, there is a decided tendency at metal oxide concentrations greater than about 4% for the melt rheology of the polymer to be such that facile thermoforming operations are no longer generally feasible. The amount of metal oxide to be utilized in producing any particular polymer composition can be readily calculated by taking into account the expected yield of the catalyst to be utilized at the conditions under which polymerization is intended to occur. For instance, when it is desired that the concentration of metal oxide be about 3% by weight of the total polymer composition and the yield to be expected is about 150 grams solid polymer/millimole of titanium, the metal oxide utilized should be about $0.3 \times 150$ grams/millimole titanium or 4.5 grams of metal oxide/millimole of titanium.

The catalysts of the present invention are formed when titanium trichloride is combined in an inert environment with the above-described organometallic compounds at temperatures normally between about 0° C. and about 150° C. and at atmospheric pressure, although higher temperatures and pressures can be utilized. With silanes or germanes, for example, it is much preferred to utilize temperatures in the upper part of said range, i.e., above about 100°C., whereas with stannanes or organometallic compounds conforming to the formula:

$$MM'_vX_nR_y$$

for example, room temperature usually suffices. The temperatures and/or pressures that are most desirably utilized with any particular combination of components can be readily determined bearing in mind that conditions that cause substantial decomposition of either of the components or of the catalyst formed therewith should be avoided.

Further, it is known that the organometallic compounds of the present invention and to some extent, the titanium trichloride can react with molecular water and/or hydroxyl groups on the surface of the finely-divided solid. It is therefore preferable to add the finely-divided solid only after formation of the active catalyst, thereby eliminating to a large extent, reaction between the catalyst components and the solid. It is particularly important that the catalyst be formed and maintained in an essentially anhydrous (free of molecular water) and oxygen-free environment. Although there are many means known in the art by which hydrocarbon solvents and finely-divided inorganic metal oxides may be dried, it is both economical and efficient to dry either the solvent alone or a dispersion of the finely-divided solid in the solvent by azeotropic distillation.

It has been found that, although the beneficial effects of the present invention on dyeability accrue even when the polypropylene produced is subsequently treated in such a manner as to increase its crystallinity, substantially greater increases in dyeability occur when said polypropylene is dyed while in less crystalline form. Thus, it is preferable to dye the polypropylene while in a less crystalline form, and thereafter treat the dyed polypropylene, for example, by annealing, as may be desired to fit it for particular uses or to impart desired properties. Thus, the polypropylene produced in accordance with the present invention is preferably first dyed and only thereafter cold drawn, annealed, woven, etc.

There follow a number of non-limiting examples:

*Example 1*

To a 5000 milliliter, three-neck, glass reaction vessel equipped with a stirrer, a condenser and nitrogen inlet and outlet tubes, there is added 3500 milliliters of toluene and about 30 grams of "Cab-O-Sil," a pyrogenic silica produced by Cabot Corporation, which has an average particle diameter of about 10 millimicrons. The resulting slurry is then dried by being heated to, and maintained at, about the boiling point of toluene, i.e., about 111° C. for about 20 hours while a water/toluene azeotrope is removed from the reaction vessel by periodic distillation until about 900 milliliters of distillate has been removed. Next, to a five-gallon stainless steel autoclave equipped with a heating jacket, stirrer, and inlet and outlet tubes there is charged about 10 liters of anhydrous toluene, 20 millimoles of 325 mesh titanium trichloride and about 60 millimoles of triethyl aluminum. After the contents of the autoclave have been stirred for about one hour at about room temperature the azeotropically dried silica/toluene mixture produced above is charged, without exposure to the atmosphere and with continuous stirring into the autoclave. Thereafter, the autoclave is heated to, and maintained at, about 80° C. and a pressure of about 200 p.s.i. is maintained therein by the periodic introduction thereinto of propylene gas. After about 36 hours of continuous operation, the introduction of propylene is arrested, and the remaining pressure in the autoclave is vented to atmosphere. About 15 liters of isopropyl alcohol is then introduced into the autoclave and the contents of the autoclave are stirred for about 15 minutes at ambient temperature. Thereafter, the solid contents of the autoclave are removed, washed with isopropyl alcohol and water, filtered and dried. It is found that about 1375 grams of solid polypropylene polymer having an intrinsic viscosity of about 3.4 and a melt index of about 1 has been produced. Said polymer is then spun with water quenching into monofilament fiber having an average diameter of about .004 inch.

Example 2

This example is essentially a duplicate of Example 1 with the exception that there is utilized in place of the Cab-O-Sil, a particulate silica having an average particle diameter of about 200 millimicrons. In all other respects, however, the procedure of Example 1 is effected. There is produced about 1500 grams of polypropylene having about the same properties as the polypropylene produced in Example 1. The polypropylene produced in this example is also spun into .004 inch monofilament fiber.

Example 3

This example is a duplicate of Example 1 with the exception that no silica is utilized and accordingly the azeotropically dried solvent introduced into the autoclave does not contain silica. Subsequently, the same polymerization procedure as described in Example 1 is followed. Upon completion of the polymerization it is found that about 1600 grams polypropylene has been produced having properties similar to those of the polypropylene produced in Example 1. This polypropylene is also spun with water quench into monofilament fiber having an average diameter of about .004 inch.

Example 4

This example is a duplicate of Example 1 to the point wherein anhydrous toluene and titanium trichloride are charged into the autoclave. However, in the present example, instead of triethylaluminum representing the organometallic compound there is charged into the autoclave about 60 millimoles of triphenylstannane. The contents of the autoclave are then heated to about 50° C. and stirred continuously for about one hour. The azeotropically dried silica/toluene mixture is then charged into the stirring catalyst mixture and the autoclave is heated to, and maintained at, about 130° C. and a pressure of about 200 p.s.i. is maintained therein by the periodic introduction thereinto of propylene gas. After 36 hours of operation under these conditions the flow of propylene gas is arrested and the contents of the autoclave treated as in Example 1. It is found that about 1125 grams of polypropylene polymer having an intrinsic viscosity of about 3.3 and melt index of about 1.3 has been produced. Said polymer is subsequently spun into monofilament fiber having an average diameter of about .004 inch.

When the above procedure is repeated with the exceptions that (1) triethylsilane is utilized instead of triphenylstannane, and (2) the catalyst mixture is heated to 140° C. instead of 50° C. prior to the polymerization step, substantially the same quantity and quality of polypropylene is produced.

Example 5

To a constant temperature scouring bath maintained at about 210° F. and consisting of about 2 liters of distilled water, 40 grams Tergenol 6, a non-ionic detergent produced by Hart Products Corporation of New York, and 1 gram sodium carbonate, there is introduced 20 grams each of the fibers produced in Examples 1–4. Thereafter, said bath is stirred for about 30 minutes, followed by washing of the samples with distilled water and drying.

Next, a dye bath is formulated consisting of about 1.6 liters distilled water, 0.8 gram Eastman Blue BNN, a dispersed anthraquinone diestuff produced by Eastman Chemical Products, Inc., and 16 grams Ultrawet 60L, an alkyl aryl sulfonate anionic dispersing agent produced by Atlantic Chemical Corporation. The dye bath is thereafter heated to, and maintained at, a temperature of about 212° F. Each of the fiber samples are entered therein for about 0.25 hour after which the samples are removed, washed and dried and visually examined under bright sunlight.

Said examination reveals that the fibers of Examples 1 and 4 dyed to about the same intensity and are far more intensely dyed than the fibers of Example 2 which in turn are dyed slightly more than the fibers of Example 3. Furthermore, microscopic examination of thin cross sections of fibers from each of said examples indicate that the dyestuff is evenly distributed throughout the fibers of Examples 1 and 4 while in the fibers of Example 2 and particularly of Example 3 diffusion of the dyestuff is limited to the peripheral portions of the fibers, the centralmost portions thereof remaining, in the case of Example 3, fibers, substantially undyed or, in the Example 2 fibers, only lightly dyed.

Example 6

This example is substantially a duplicate of Example 5; however, in this example, a vat dye is used and the procedure is therefore modified towards this end. 20 grams each of the fibers produced in Examples 1–4 are treated as set forth in the first paragraph of Example 5. Next, a dye bath is produced by dissolving about 2 grams Calcoloid Pink FFD Double PDR, a thioindigoid vat dyestuff produced by American Cyanamid Co., and 5 grams of sodium hydroxide in 400 milliliters distilled water. Said solution is then heated to, and maintained at, about 180° F. for five minutes. Next, the solution is allowed to cool to ambient temperatures and distilled water is then added to make up a total volume of about 1.6 liters. Thereafter, the dye solution is heated to, and maintained at a temperature of about 212° F. The scoured fiber samples are then submersed in the resulting solution for one hour. During said dyeing procedure, said dye is kept in a reduced state by periodic addition to the bath of sodium hydrosulfite as required. Thereafter, said samples are removed, rinsed with distilled water and about 8 grams sodium perborate dissolved therein. The samples are submersed in said bath for about 30 minutes and are then rinsed with distilled water and dried. It is found once again that the fiber samples of Examples 1 and 4 clearly dye to a substantially greater intensity than the fiber samples of Examples 2 and 3.

It should be noted that although it is entirely possible to blend by physical means, such as by milling, a finely-divided metal oxide having an average particle diameter of less than about 50 millimicrons into a polypropylene polymer and thereby improve the dyeability of said polymer to some extent, there exist several serious detrimental aspects to such a procedure. Firstly, said procedure requires the incorporation of a far greater amount of metal oxide than is necessary in the practice of the present invention in order to gain a given level of dyeability. Secondly, since far greater amounts of said metal oxide are required to gain a given level of dyeability, the physical properties of the completed polypropylene composition which normally determine a polymer's fitness for use as a textile fiber are generally deleteriously affected (percentage elongation at yield is lower, severe drop in melt index occurs, etc.). Thirdly, said procedure requires relatively expensive equipment and operations. Finally, physical blending of metal oxides in polypropylene by such means generally requires that said polymer be subjected to heating and relatively high shear forces, both of which are undesirable.

The polypropylene polymers produced by the process of this invention can be subjected to such aftertreatment as may be desired. Thus, said polymers can be mechanically milled, filmed, or cast, or converted to sponges or latices. Also, antioxidants, stabilizers, extenders, plasticizers, pigments, insecticides, fungicides, etc., can be incorporated into said polymers if desired.

Obviously, many changes can be made in the above-described examples and procedures without departing from the scope of the invention. For example, although only vat and disperse dyes are mentioned in the above examples, sulphur and acid dyes can also be utilized in dyeing the polypropylene polymers of the present invention. For example, a dye such as Alizarine Blue GRL, an acid dye produced by National Aniline Division, Allied Chemical Corporation, is entirely suitable for the purposes of the present invention.

Also pyrogenically conformed, or coprecipitated metal oxides, or metal oxides coformed with, or mixed with, other compounds are suitable for the purposes of the present invention. It is pointed out that it is intended and it should be understood that for the purposes of the present specification and the claims appended hereto, the term, metal oxide includes silica.

Accordingly, it is intended that the above disclosure be regarded as illustrative and as in no way limiting the scope of the invention.

What is claimed is:

1. A process for producing polypropylene having vastly improved dyeability which comprises contacting at temperatures between about −25° C. and about 250° C. in a liquid hydrocarbon medium, propylene with a catalyst and between about 0.25% and about 5% by weight of the total polypropylene product of a finely-divided metal oxide having no dimension greater than about 50 millimicrons said catalyst comprising the product of the reaction between titanium trichloride and a compound conforming to the empirical formula:

(a) 

wherein each R is chosen from the group consisting of monovalent hydrocarbon radicals, monovalent alkoxy radicals, monovalent aryloxy radicals and the halogens; p is a number from 0 to 3; each H is a hydride radical; t is a number from 1 to 4; M is a quadrivalent metal chosen from the group consisting of silicon, germanium, tin and lead; and O is oxygen, or (b) $MM'_vX_nR_y$ wherein M is chosen from the group consisting of the metals of Groups I, II and III of the periodic table; M' is a metal of Groups I; $v$ is a number from 0 to 1; each X is any halogen; $n$ is a number from 0 to 3; each R is chosen from the group consisting of any monovalent hydrocarbon radical and hydrogen; and $y$ is a number from 1 to 4.

2. The process of claim 1 wherein said finely-divided metal oxide is chosen from the group consisting of silica, magnesia, titania, alumina, zirconia, and mixtures thereof.

3. The process of claim 1 wherein said finely-divided metal oxide is silica.

4. The process of claim 1 wherein said finely-divided metal oxide is alumina.

5. The process of claim 1 wherein the quantity of said finely-divided metal oxide utilized is between about 0.25% and about 4% by weight of the total polypropylene product.

6. The process of claim 1 wherein in the formula:

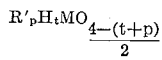

$p$ is 3, $t$ is 1, and each R is any alkyl group.

7. The process of claim 1 wherein the compound conforming to the formula:

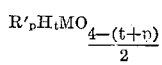

is a silane or stannane.

8. The process of claim 1 wherein in the formula:

$MM'_vX_nR_y$ $v$ is 0; $n$ is 0; and each R is any monovalent hydrocarbon radical.

9. The process of claim 1 wherein in the formula:

$MM'_vX_nR_y$

M is aluminum; $v$ is 0; $n$ is 0; and each R is any hydrocarbon radical.

References Cited
UNITED STATES PATENTS

| | | | |
|---|---|---|---|
| 2,915,475 | 12/1959 | Bugosh | 8—55 |
| 2,981,725 | 4/1961 | Luft | 260—94.9 |
| 3,008,943 | 11/1961 | Guyer | 260—94.9 |
| 3,166,542 | 1/1965 | Orzechowski | 260—94.9 |
| 3,166,544 | 1/1965 | Orzechowski | 260—94.9 |

JOSEPH L. SCHOFER, *Primary Examiner.*

F. L. DENSON, *Assistant Examiner.*